United States Patent
Singhal et al.

(10) Patent No.: US 12,210,779 B2
(45) Date of Patent: Jan. 28, 2025

(54) SYSTEM AND METHOD FOR SLICE DISTRIBUTION OF NETWORK ATTACHED STORAGE ASSETS BASED ON SLICE METADATA

(71) Applicant: Dell Products L.P., Round Rock, TX (US)

(72) Inventors: Upanshu Singhal, Bangalore (IN); Ashish Kumar, Bangalore (IN); Nitin Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/157,762

(22) Filed: Jan. 20, 2023

(65) Prior Publication Data
US 2024/0248649 A1 Jul. 25, 2024

(51) Int. Cl.
*G06F 3/06* (2006.01)

(52) U.S. Cl.
CPC ............ *G06F 3/067* (2013.01); *G06F 3/0604* (2013.01); *G06F 3/0655* (2013.01)

(58) Field of Classification Search
CPC ............. G06F 11/1464; G06F 11/1451; G06F 16/24568; G06F 3/067; G06F 3/0655; G05F 3/0604
See application file for complete search history.

(56) References Cited

U.S. PATENT DOCUMENTS

| | | | |
|---|---|---|---|
| 7,650,341 B1 | 1/2010 | Oratovsky | |
| 9,384,200 B1 | 7/2016 | Batchu | |
| 9,600,487 B1 | 3/2017 | Pandian et al. | |
| 9,778,994 B1 | 10/2017 | Viswanathan | |
| 10,069,909 B1 | 9/2018 | Chopra et al. | |
| 10,185,500 B1 | 1/2019 | Chopra | |
| 10,613,945 B1 | 4/2020 | Chopra | |
| 10,719,413 B2 | 7/2020 | Yadav | |
| 10,754,696 B1 | 8/2020 | Chinnam | |
| 11,005,935 B1 | 5/2021 | Littlefield | |
| 11,256,573 B1 * | 2/2022 | Ambaljeri | ........... G06F 11/1461 |
| 2018/0046553 A1 | 2/2018 | Okamoto | |
| 2020/0210091 A1 | 7/2020 | Shu | |
| 2020/0241971 A1 | 7/2020 | Madan | |
| 2020/0334215 A1 * | 10/2020 | Dangi | ................... G06F 16/192 |
| 2020/0341642 A1 | 10/2020 | Appireddygari Venkataramana | |
| 2021/0200641 A1 | 7/2021 | Bafna | |

(Continued)

OTHER PUBLICATIONS

Great Britain Office Action received for corresponding application No. 2400413.7 mailed on Jul. 19, 2024, 3 pages.

*Primary Examiner* — Jane W Benner
(74) *Attorney, Agent, or Firm* — Chamberlain, Hrdlicka, White, Williams & Aughtry; Aly Dossa

(57) ABSTRACT

A method for managing network attached storage (NAS) assets obtaining, by a backup manager, a backup request for backing up the NAS assets, in response to the backup request: determining a number of streams available to be performed in parallel by a set of backup agents, obtaining a set of slices associated with the NAS assets, performing a categorization on the set of slices based on metadata associated with the set of slices to obtain a set of batches, initiating a slice distribution of the set of slices to the set of backup agents based on the set of batches and the number of streams, and storing the set of slices in a backup storage system.

20 Claims, 8 Drawing Sheets

(56) References Cited

U.S. PATENT DOCUMENTS

| | | |
|---|---|---|
| 2021/0289025 A1 | 9/2021 | Littlefield |
| 2021/0334174 A1 | 10/2021 | Ashraf |
| 2022/0083430 A1* | 3/2022 | Yadav .................. G06F 9/5077 |
| 2022/0121525 A1* | 4/2022 | Brenner ................ G06F 16/185 |
| 2022/0121528 A1 | 4/2022 | Brenner et al. |
| 2022/0269570 A1 | 8/2022 | Agarwal |
| 2022/0334925 A1 | 10/2022 | Rakesh et al. |
| 2024/0202074 A1 | 6/2024 | Acharya |
| 2024/0202079 A1 | 6/2024 | Acharya |

* cited by examiner

SYSTEM AND METHOD FOR SLICE DISTRIBUTION OF NETWORK ATTACHED STORAGE ASSETS BASED ON SLICE METADATA

BACKGROUND

Computing devices in a system may include any number of internal components such as processors, memory, and persistent storage. The computing devices may execute applications (e.g., software). Each application may be upgraded to newer versions. The time taken to upgrade the application to the newer version may interrupt the operation of the computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
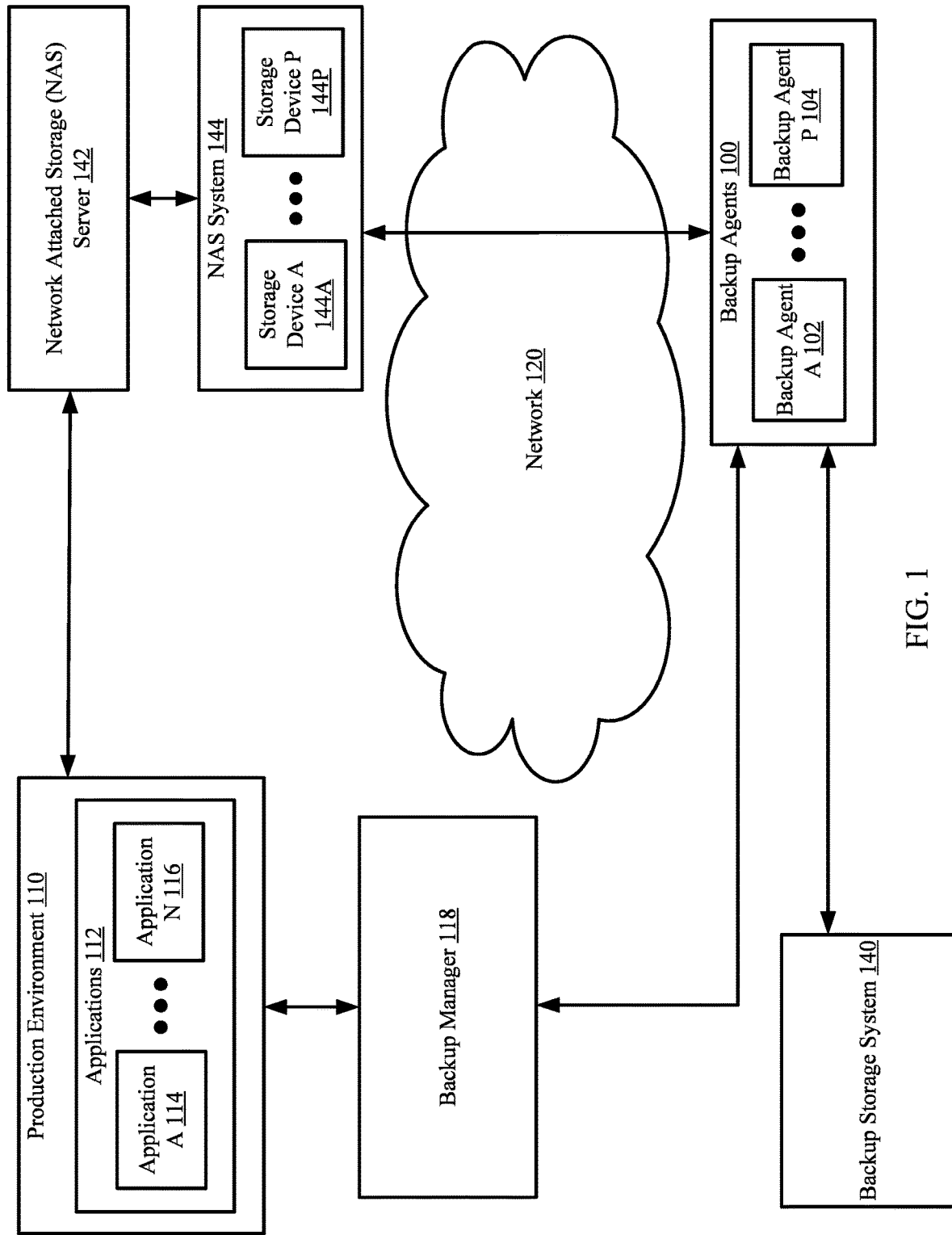
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for distribution of backup or recovery streams to multiple backup agents in parallel to balance the workload equally or in an optimal manner to maximize the usage of available capacity on all backup agents. A capacity of a backup agent may be determined based on a number of parallel write streams to a backup storage system, a number of parallel read streams from the NAS system, and a number of CPUs on the backup agents.

The backups of a network attached storage (NAS) asset may be divided into slices, and a maximum number of streams may be determined based on the capacity of a compute node and based on administrative configurations. Each stream may initiate the backup of one of the slices at a time. After the slices are generated, a backup manager may distribute the slices for backup on multiple compute nodes with different methods as described herein. For example, for actual data backup and recovery, a default eight number of parallel streams are used. However, for pre-backup and post-backup tasks (also referred to as "pre-backup operations" or "post-backup operations", respectively), only one stream is used. This may help in keeping the capacity on the compute nodes to execute other tasks for other NAS assets.

In one or more embodiments of the invention, an algorithm and system may follow an approach to distribute backup and recovery streams based on, for example: (i) user input for desired number of parallel streams, (ii) input/output (IO) operations that maximize backup throughput or minimal impact on an NAS array during backup, (iii) available compute node capacity, (iv) a number of Assets to be backed up concurrently, (v) a number of tasks to be executed concurrently for each asset, and (vi) slice metadata analysis taking in account the size of each slice or number of files in each slice with every backup operation (e.g. for every backup, slice data is analyzed to prioritize slice distribution for biggest slices first and smaller slices later).

In one or more embodiments, the backup manager may include functionality for obtaining requests for backing up a set of NAS assets and distributing the backup operations between a set of backup agents. The backup agents may each include functionality for generating the slices of the backups, reserving any number of streams, and assigning the streams to the slices. The generation of the slices may be a pre-backup task. The slices may be consolidated at a target storage (e.g., the backup storage system). The consolidation of the backups may be a post-backup operation.

Specifically, the backup manager, in response to a backup request, determines the number of parallel streams to be executed and initiates the backup operation with the determined number of parallel streams. This may allow an administrative user to configure (e.g., increase or decrease) the number of parallel streams executed for each asset backup. The backup manager may track the maximum number of read streams for the NAS assets from the NAS. In this manner, if the number of parallel streams have all been assigned to a slice of one or more backup assets, the backup manager may keep the slices in queue until available read streams are available. The slices may be assigned, e.g., in batches, where the backup manager performs a grouping of the initial slices to be processed, and assigns the streams to the slices in the grouping. Following the initial assignment, the backup manager may monitor the backup operations and assign slices to streams as they complete the backup operation, pre-backup task, and/or post-backup task and become available.

In one or more embodiments, the backup manager further includes functionality for tracking information about maximum number of write streams allowed on target storage (e.g., the backup storage system), and orchestrate the slices based on its limit.

In one or more embodiments, the slice distribution performed by the backup manager is designed in such a way that it can distribute the slices based on slice metadata and backup history with respect to data change rate or number of files or file size with each backup. For example, the backup manager can sort the slices based on data change rate and execute the slices with least data change rate to execute first and higher data change rate slices later. This slice distribution may aid in completing backup of small data change faster and maximize the usage of backup agents to execute a backup of large data change slices.

In this manner, the backup manager includes functionality for assigning streams for: a backup operation as discussed throughout, a pre-backup task (e.g., as discussed throughout), or a post-backup task.

Various embodiments of the invention are described below.

FIG. 1 shows an example system in accordance with one or more embodiments of the invention. The system includes a production environment (110) that includes one or more applications (112), a backup manager (118), a backup storage system (140), a set of backup agents (100), a network attached storage (NAS) server (142), and a NAS system (144). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the production environment (110) may include applications (112). The applications (114, 116) may be logical entities executed using computing resources (not shown) of the production host (110). Each of the applications (114, 116) may be performing similar or different processes. In one or more embodiments of the invention, the applications (112) provide services to users, e.g., clients (not shown). For example, the applications (112) may host components. The components may be, for example, instances of databases, email servers, and/or other components. The applications (112) may host other types of components without departing from the invention. An application (112) may be executed on one or more production hosts as instances of the application.

In one or more embodiments, the applications (112) may utilize a file system to manage the storage of data. In one or more embodiments of the invention, a file system is an organizational data structure that tracks how data is stored and retrieved in a system. The file system may specify references to files and any data blocks associated with each file. Each data block may include a portion of application data for an application. In one or more embodiments, the file data, application data, and/or other data utilized by the applications (112) are stored in the NAS system (144). The aforementioned data is accessed by the applications (112) via a NAS server (142) (further discussed below).

In one or more embodiments of the invention, the applications (112) are implemented as computer instructions, e.g., computer code, stored on a persistent storage that when executed by a processor(s) of a computing device cause the computing device to provide the functionality of the applications (112) described throughout this application.

In one or more embodiments, the backup manager (118) includes functionality for servicing requests issued by the applications (112). The applications (112) may issue requests for performing workloads associated with the data accessed by the applications (112). The workloads may include workloads for backing up the application data, for accessing one or more files from the NAS system (144), for performing incremental backups of the application data, and/or any other workloads without departing from the invention. In one or more embodiments, the backup manager (118) services requests for workloads in accordance with FIGS. 2-9.

In one or more embodiments, the backup manager (118) includes functionality for managing a universal library of two or more protocols that are utilized by the applications (112). In this manner, each application (114, 116) may operate using a protocol such that the backup manager (118) may service the multiple protocols utilized by the collective applications (112). Examples of the protocols included in the universal library include, but are not limited to: network file system (NFS), server message block (SMB), and common internet file system (CIFS). For example, the backup manager (118) may provide an application programming interface (API) for each application (114, 116) and/or for each protocol provided by the backup manager (118).

In one or more embodiments, the backup manager (118) further includes functionality for managing the backup operations and/or the recovery operations of NAS assets. The backup manager (118) may initiate slice distribution using the backup agents (100) for generating backups to be stored in the backup storage system (140).

Figure 7:
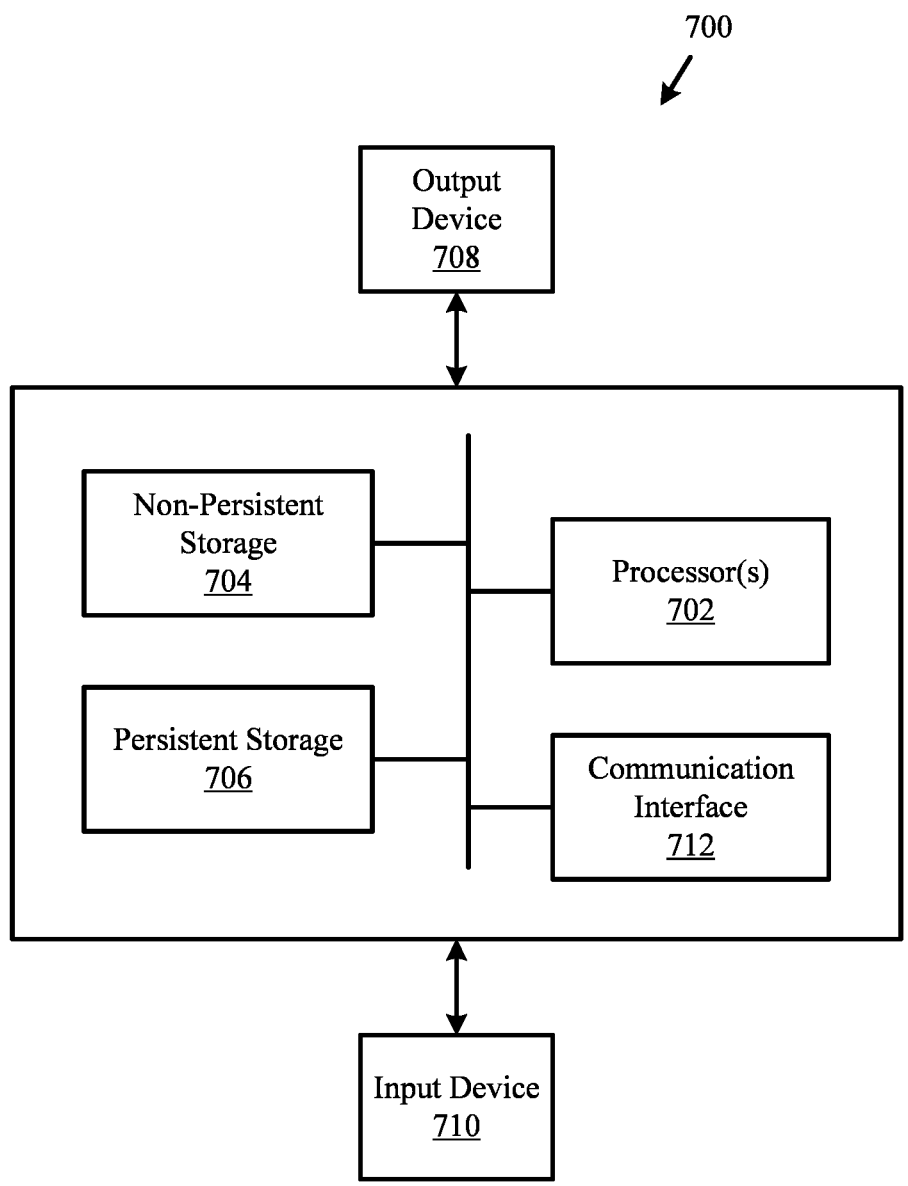
FIG. 7 shows a diagram of a computing device in accordance with one or more embodiments of the invention.

In one or more embodiments of the invention, the backup manager (118) is implemented as a computing device (see e.g., FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup manager (118) described throughout this application and/or all, or a portion thereof, of the methods illustrated in FIGS. 2-3B.

While not illustrated in FIG. 1, the production environment (110) may include multiple production hosts. Each production host may operate independently from each other. Each production host may include an operable connection to the NAS system (140) via the NAS server (142).

In one or more embodiments, the NAS server (142) includes functionality for servicing requests issued by the applications (112). The NAS server (142) may service the requests by accessing or otherwise obtaining data from NAS assets stored in the NAS system (144). The NAS server (142) may further include functionality for storing data provided from the applications (112).

In one or more embodiments, the NAS server (142) is implemented as a computing device (see e.g., FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the NAS server (142) described throughout this application.

In one or more embodiments of the invention, the NAS server (142) is implemented as a logical device. The logical device may utilize the computing resources of any number of computing devices and thereby provide the functionality of the NAS server (142) described throughout this application.

In one or more embodiments of the invention, the NAS server (142) stores the data in a NAS asset (e.g., a file system) in a NAS system (144). The NAS system (144) may include any number of storage devices (144A, 144P). Each storage device (144A, 144P) includes functionality for storing application data, file data (e.g., data associated with a file system), and/or any other data without departing from the invention. The data stored in the NAS system (144) may be accessible via the NAS server (142).

In one or more embodiments, the backup storage system (140) includes functionality for storing backups. The backups may be generated and/or stored via the backup manager (118). The backup storage system (140) may store backups obtained from the backup manager (118). The backups may be generated in accordance with FIGS. 2-9.

In one or more embodiments, the backup agents (100) include functionality for servicing backup tasks. The backup tasks may be pre-backup operations, backup operations, and post-backup operations. In one or more embodiments of the invention, the pre-backup operation is a process for generating a set of slices for one or more NAS assets. The pre-backup operation may be performed in accordance with FIGS. 2 and 4. In one or more embodiments of the invention, the backup operation is a process for copying data associated with a slice of a NAS asset and transmitting the copy to the backup storage system (140) or to another backup agent for a post-backup operation. In one or more embodiments of the invention, the post-backup operation is a process for consolidating the data associated with the slices of a NAS asset to generate a backup of the NAS asset. The post-backup operation may further include transmitting the backup to the backup storage system (140).

In one or more embodiments of the invention, the backup agents (102, 104) each generate a backup container (not shown) to perform the backup tasks. Each backup container may be a virtualization of resources that includes functionality for obtaining data and servicing the corresponding backup task using an available stream (discussed below) of the backup agent (102, 104).

In one or more embodiments, the backup agents (102, 104) are each implemented as a computing device (see e.g., FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agents (102, 104) described throughout this application.

In one or more embodiments of the invention, the backup agents (102, 104) are implemented as a logical device. The logical device may utilize the computing resources of any number of computing devices and thereby provide the functionality of the backup agents (102, 104) described throughout this application.

Figure 2:
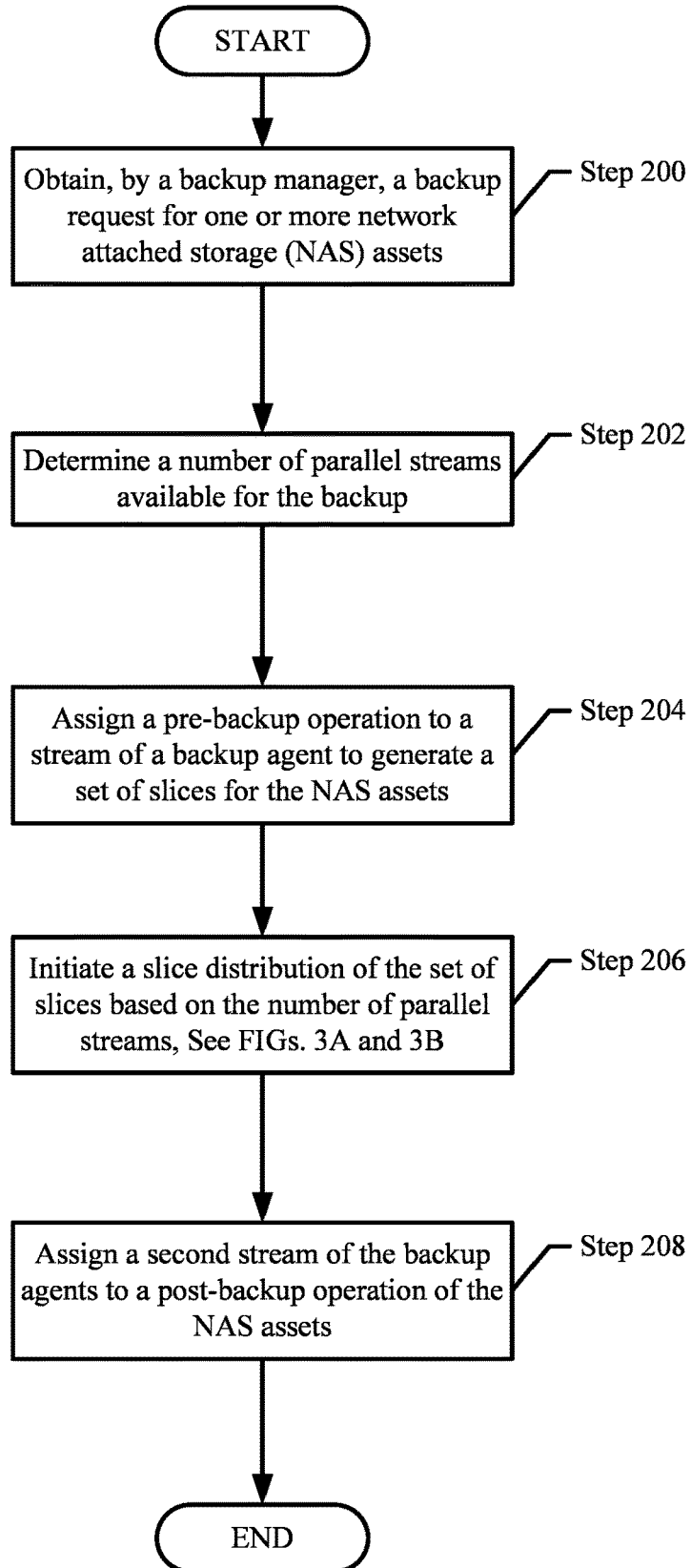
FIG. 2 shows a flowchart for distribution of backup operations of network attached storage (NAS) assets in accordance with one or more embodiments of the invention.
Figure 3A:
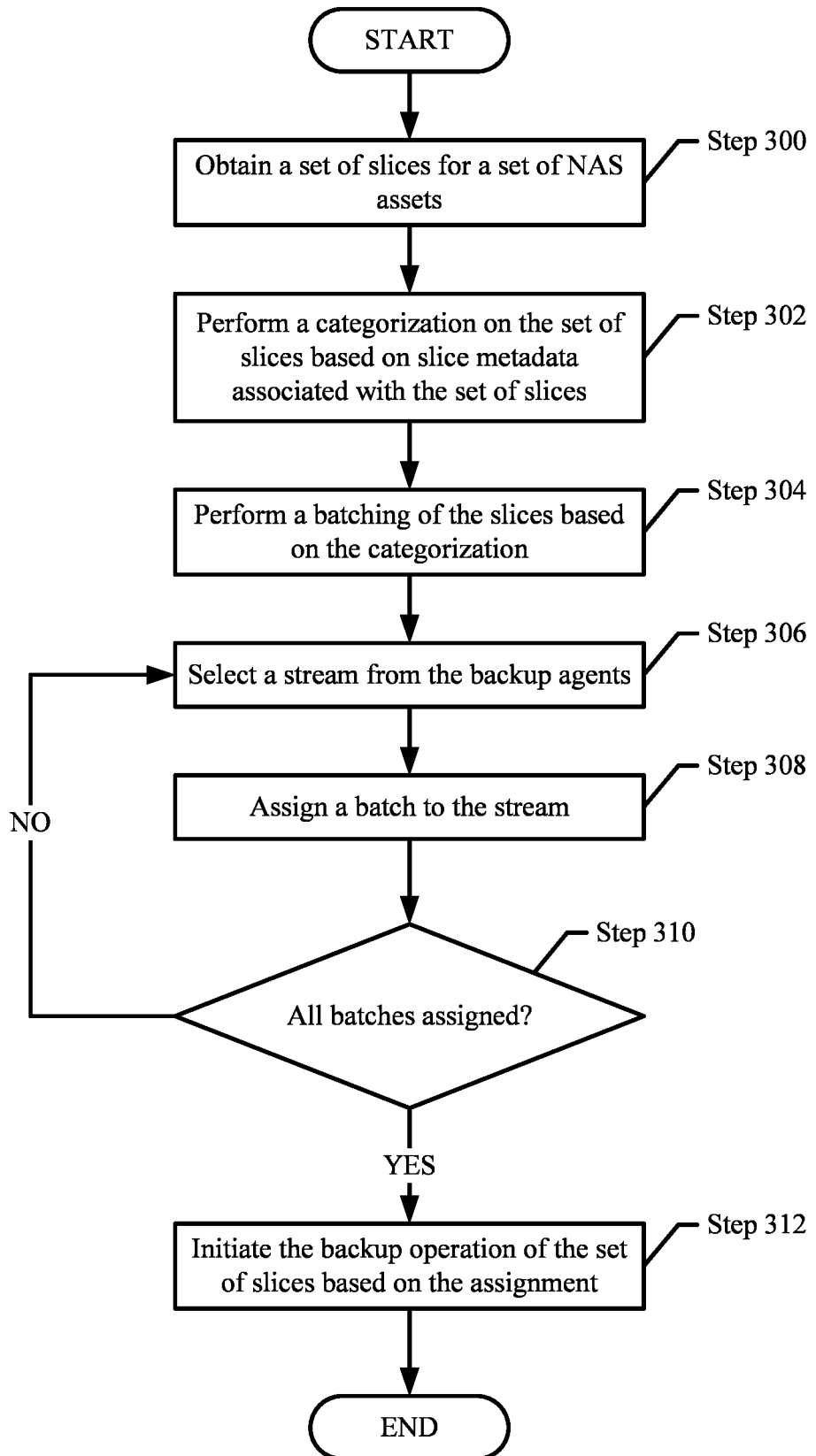
FIG. 3A shows a flowchart for performing a slice distribution using metadata of the slices in accordance with one or more embodiments of the invention.
Figure 3B:
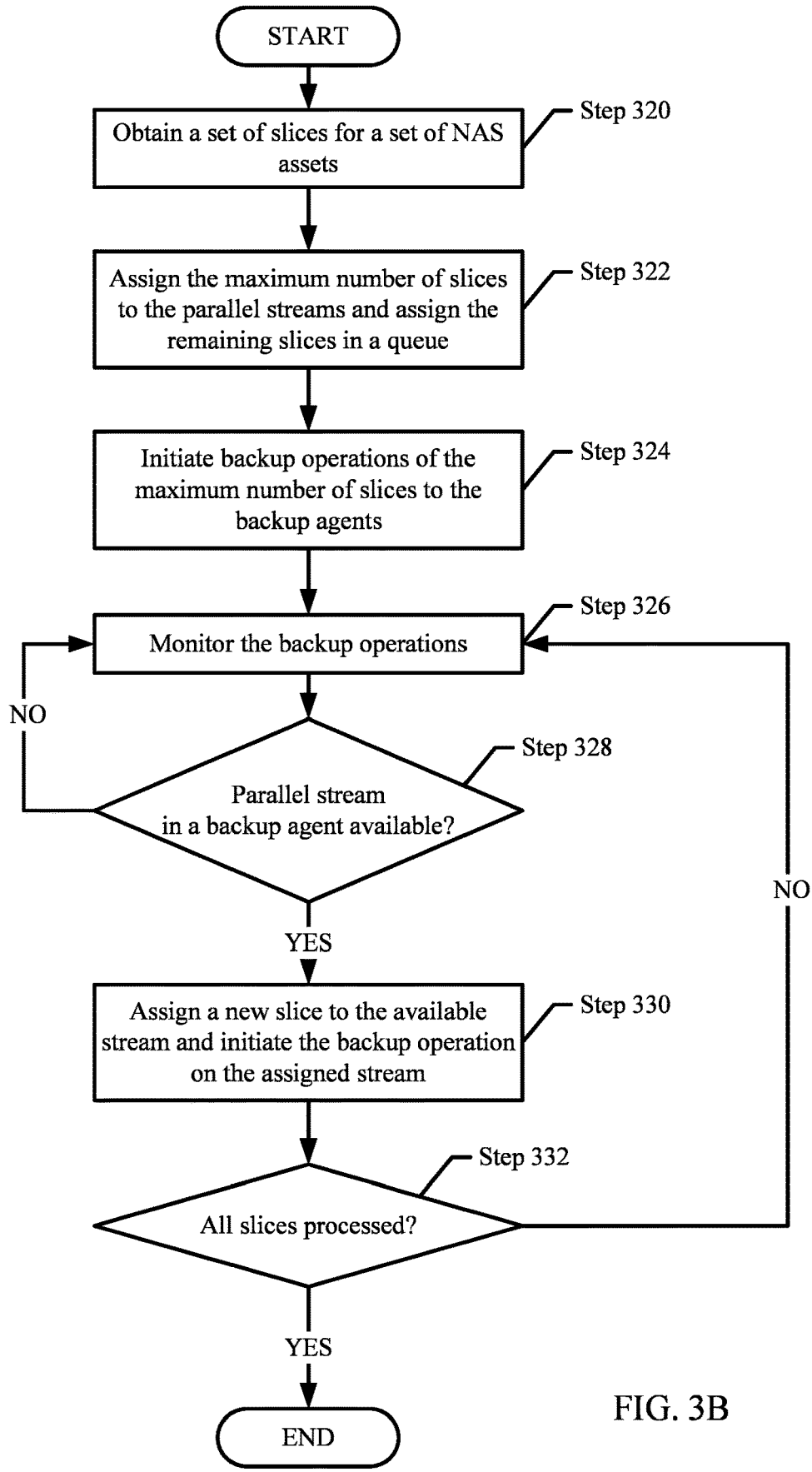
FIG. 3B shows a flowchart for performing a slice distribution based on available streams in accordance with one or more embodiments of the invention.
Figure 4:
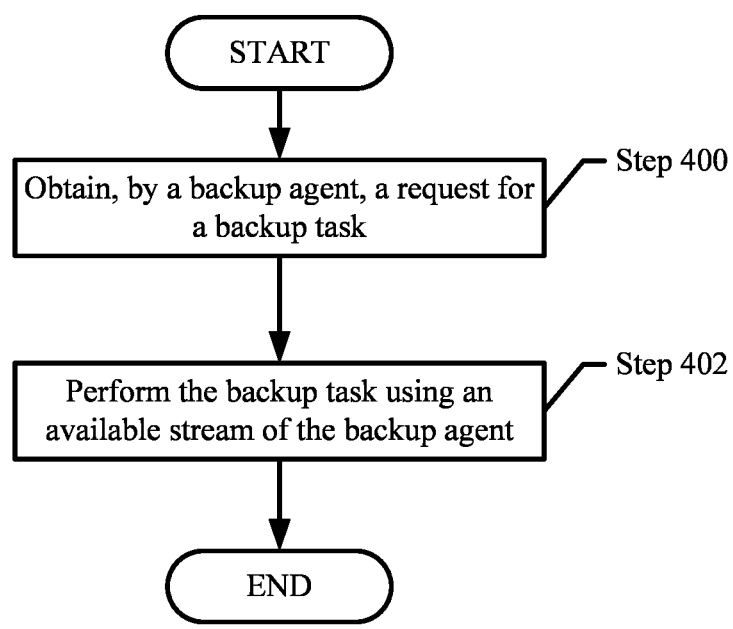
FIG. 4 shows a flowchart for servicing requests for backup operations in accordance with one or more embodiments of the invention.

FIGS. 2-4 show flowcharts in accordance with one or more embodiments of the invention. Each flowchart illustrated in FIGS. 2-4 describe a method for servicing a workload in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2-4 may be performed in parallel with any other steps shown in FIGS. 2-4 without departing from the scope of the invention.

FIG. 2 shows a flowchart for distribution of backup operations of network attached storage (NAS) assets in accordance with one or more embodiments of the invention. The method shown in FIG. 2 may be performed by, for example, a backup manager (118, FIG. 1). Other components of the system illustrated in FIG. 1 may perform the method of FIG. 2 without departing from the invention.

Turning to FIG. 2, in step 200, a backup request is obtained for one or more NAS assets. In one or more embodiments, the backup request specifies one or more NAS assets to be backed up. The backup request may be obtained from the application(s).

In step 202, a number of parallel streams available for the backup is determined. In one or more embodiments, the parallel streams are determined based on a configuration of the backup agents. The configuration (which may be applied by an administrator of the backup agents) may specify a number of streams permitted by each backup agent to be assigned for backup tasks. The backup tasks may be pre-backup tasks, post-backup tasks, or backup operations.

In step 204, a pre-backup operation is assigned to a stream of a backup agent to generate a set of slices for the NAS assets. The pre-backup operation may be a task that includes generating the set of slices. Each slice may be a portion of data associated with a NAS asset. Collectively, a portion of the set of slices may be associated with all data of a NAS asset. Each slice may be associated with one or more files of a NAS asset.

The backup manager may select one of the available streams for the purpose of performing the pre-backup operation on a first NAS asset. In one or more embodiments of the invention, a stream is selected for each NAS assets in the set of NAS assets to be backed up. The pre-backup operations may be performed in parallel by the respective streams. In another embodiment, one stream may be assigned for performing the pre-backup operations of all NAS assets. In this embodiment, one pre-backup operation may be performed at a time, with the remaining pre-backup operations being placed in a queue to be performed serially via the one assigned stream. The result of the pre-backup operations may be the generation of the set of slices.

In one embodiment, the slices are generated based on a slice size limit. For example, the each slice may be generated such that the data associated with a slice does not exceed a predefined size.

In another embodiment, the slices are generated based on a predefined number of slices. For example, an administrator managing the configuration of the backup operations may specify that a predefined number of slices be generated per NAS asset.

In another embodiment, the slices are generated based on the determined number of available streams. For example, if 100 streams are available for parallel processing, the number of slices may be 100 slices per NAS asset or 100 slices total for all NAS assets.

The number of slices and the size of each slice may be determined via any other mechanism without departing from the invention.

In step 206, a slice distribution of the set of slices is initiated based on the number of parallel streams. In one or more embodiments, the slice distribution is a method for assigning the slices to be processed (e.g., as backup operations) by the backup agents via the available streams and initiating the backup operations based on the assigning. The backup operations may include generating a copy of the data associated with the slices and storing the copy of the data in the backup storage system.

In one or more embodiments, the slice distribution is performed based on the metadata of the set of slices. The slice distribution based on the metadata is performed in accordance with FIG. 3A. The slice distribution based on the metadata may be performed in accordance with any other method without departing from the invention.

In one or more embodiments, the slice distribution is performed based on the available streams on the backup agents. The slice distribution based on the available streams on the backup agents is performed in accordance with FIG. 3B. The slice distribution based on the available streams on the backup agents may be performed in accordance with any other method without departing from the invention.

In step 208, a second stream of the backup agents is assigned to a post-backup operation of the NAS assets. In one or more embodiments, the post-backup operation includes a task for consolidating the slices generated by the backup agents to obtain a backup of a NAS asset and storing the backup in the backup storage system. Similar to the assigning of the pre-backup operation, the backup manager may select one of the available streams for the purpose of performing the post-backup operation on a first NAS asset. In one or more embodiments of the invention, a stream is selected for each NAS assets in the set of NAS assets to be backed up. The post-backup operations may be performed in parallel by the respective streams. In another embodiment, one stream may be assigned for performing the pre-backup operations of all NAS assets. In this embodiment, one pre-backup operation may be performed at a time, with the remaining pre-backup operations being placed in a queue to be performed serially via the one assigned stream. The result of the post-backup operations may be the storage of backups of the NAS assets in the backup storage system.

FIG. 3A shows a flowchart for performing a slice distribution using metadata of the slices in accordance with one or more embodiments of the invention. The method shown in FIG. 3A may be performed by, for example, the backup manager (118, FIG. 1). Other components of the system illustrated in FIG. 1 may perform the method of FIG. 3A without departing from the invention.

Turning to FIG. 3A, step 300, a set of slices is obtained for a set of NAS assets. In one or more embodiments of the invention, the set of slices are obtained following the generation in accordance with step 204 of FIG. 2.

In step 302, a categorization is performed on the set of slices based on slice metadata associated with the set of slices. In one or more embodiments of the invention, the slice metadata (also referred to simply as "metadata") may be a data structure that specifies information associated with each slice and/or the files in each slice. The information in the slice metadata may include, for example, a number of files for each slice, a size of each file in each slice, a total size for each slice, and/or the corresponding NAS asset for a slice. Other information may be included in the slice metadata without departing from the invention.

In step 304, a batching is performed on the set of slices based on the categorization. In one or more embodiments of the invention, the batching is a process for grouping the slices based on the slice metadata.

In one embodiment, the slices are grouped by average file sizes of the slices. For example, slices with similar (or substantially similar) average file sizes are grouped into one batch.

In another embodiment, the slices are grouped based on the number of files in each slice. For example, slices within a predefined range may be grouped in a batch.

In another embodiment, the slices are grouped based on a total size of the slices. For example, the slices may be processed in a predefined order, and a predefined batch size threshold may be used to group the slices such that after the size of the files in one batch meet or exceed the batch size threshold, a new batch may be generated, and the remaining slices to be processed are assigned to the new batch. This may be repeated until all slices are processed.

In step 306, a stream is selected from the backup agents. In one or more embodiments, the stream is a stream that is not yet assigned to a batch and available for performing the backup operation.

In step 308, a batch is assigned to the stream. The batch may be a batch that is not yet assigned to be processed. In one or more embodiments, the batch is assigned such that the stream is used to perform a backup operation on each slice in the assigned batch.

In step 310, a determination is made about whether all batches are assigned. If all batches are assigned, the method proceeds to step 312; otherwise, the method proceeds to step 306.

In step 312, the backup operation of the set of slices is initiated based on the assignment. In one or more embodiments, the backup operation is initiated by sending requests for a task to the backup agents in accordance with the assignments of steps 306-310. The request specifies performing the backup operations. As discussed above, the backup operation of a task includes generating copies of the data of the slices, stored in a NAS system, in a batch using the assigned stream and transmitting the copies to the backup storage system. Alternatively, the copies of the data may be transmitted to a stream performing a post-backup operation (e.g., as discussed in step 208 of FIG. 2).

FIG. 3B shows a flowchart for performing a slice distribution based on available streams in accordance with one or more embodiments of the invention. The method shown in FIG. 3B may be performed by, for example, the backup manager (118, FIG. 1). Other components of the system illustrated in FIG. 1 may perform the method of FIG. 3B without departing from the invention.

Turning to FIG. 3B, in step 320, a set of slices is obtained for a set of NAS assets. In one or more embodiments of the invention, the set of slices are obtained following the generation in accordance with step 204 of FIG. 2.

In step 322, the maximum number of slices are assigned to the parallel streams. In one or more embodiments, it is determined that the total number of slices to be processed is more than the total number of available streams for backup operations.

In step 324, a backup operation of the maximum number of slices to the backup agents is initiated. In one or more embodiments, the backup operation is initiated by assigning a slice to each of the available streams. The remaining slices are assigned to a queue for later processing. The backup operation may further be initiated by sending requests for a task to the backup agents in accordance with the assignments. The request specifies performing the backup operations. As discussed above, the backup operation of a task includes generating copies of the data of the slices, stored in a NAS system, using the assigned stream and transmitting the copies to the backup storage system. Alternatively, the copies of the data may be transmitted to a stream performing a post-backup operation (e.g., as discussed in step 208 of FIG. 2).

In step 326, the backup operations are monitored. Specifically, the backup manager monitors to detect whether the processing of a slice is completed and a parallel stream of a backup agent becomes available after completing a backup operation.

In step 328, a determination is made about whether a parallel stream in a backup agent is available. If a parallel stream is available, the method proceeds to step 330; otherwise, the method returns to step 326.

In step 330, following the determination that a parallel stream is available, a new slice is assigned a new slice to the available stream. The new slice may be a slice that was previously assigned to the queue. A backup operation may be initiated for the new slice based on the assignment.

In step 334, a determination is made about whether all slices are processed. If all slices are processed, the method ends following step 334; otherwise, the method returns to step 326.

FIG. 4 shows a flowchart for servicing requests for backup operations in accordance with one or more embodiments of the invention. The method shown in FIG. 4 may be performed by, for example, a backup agent (102, 104, FIG. 1). Other components of the system illustrated in FIG. 1 may perform the method of FIG. 4 without departing from the invention.

Turning to FIG. 4, in step 400, a request for a backup task is obtained. In one or more embodiments, the backup task may specify performing a pre-backup operation, a backup operation, or a post-backup operation. If the task specifies a backup operation, the task may further include one or more slices to be processed.

In step 402, the backup task is performed using an available stream of the backup agent. In one or more embodiments, the backup task is performed by generating a backup container that services the backup task. The backup container may utilize one or more of the available streams to perform the pre-backup operation, the backup operation, or the post-backup operation.

Example 1

Figure 5:
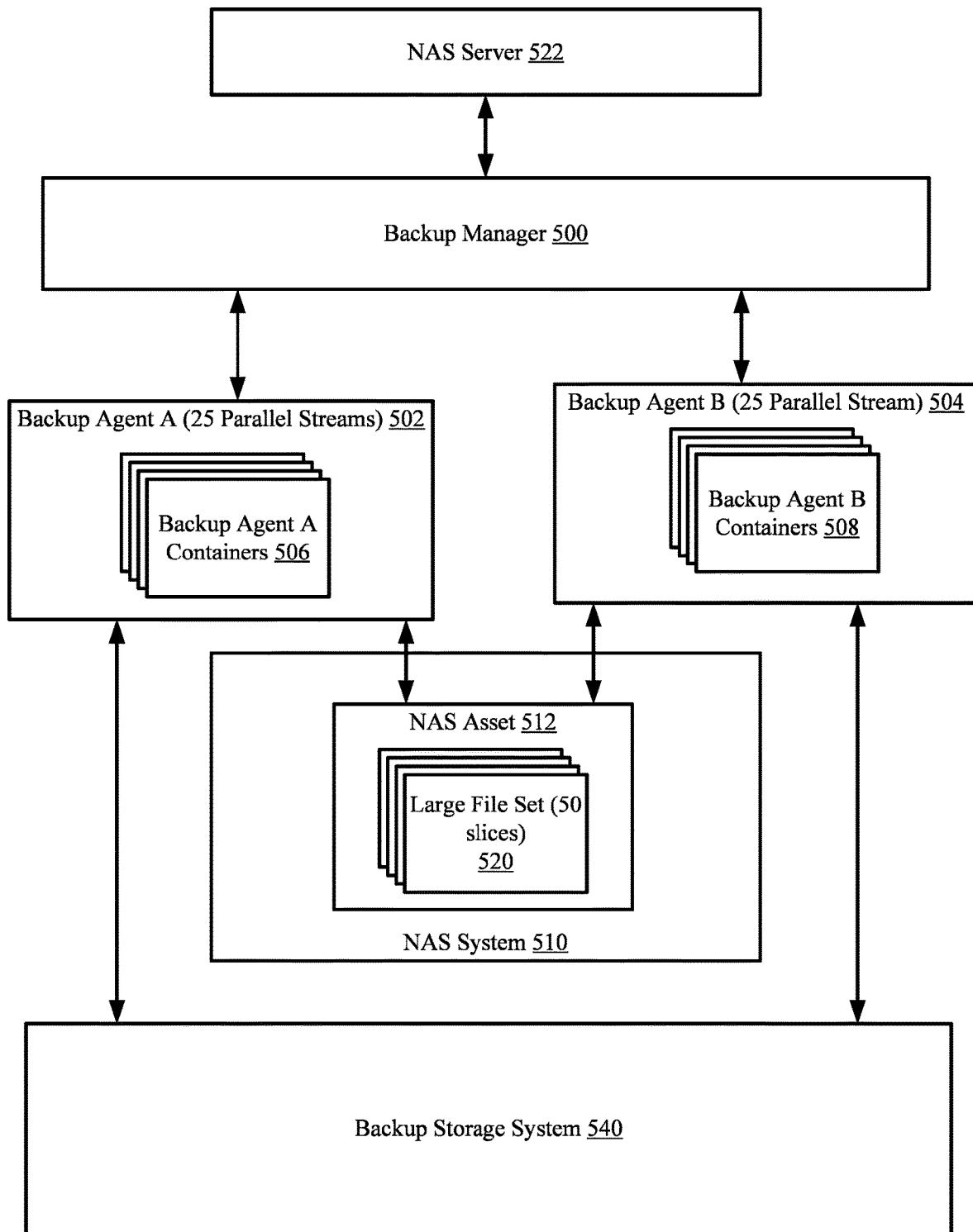
FIGS. 5-6 each show an example in accordance with one or more embodiments of the invention.

The following section describes an example. The example, illustrated in FIG. 5, is not intended to limit the invention and is independent from any other examples discussed in this application. Turning to the example, consider a scenario in which a NAS server utilizes a backup manager to obtain a backup of a NAS asset that includes a million files stored in a network attached storage (NAS) system.

Turning to the example, FIG. 5 shows a diagram of an example system. For the sake of brevity, not all components of the example system may be illustrated in FIG. 5. The example system may include a backup manager (500), a backup storage system (540), a NAS server (522), two backup managers (502, 504), and a NAS system (510). The backup agents (502, 504) each include a set of backup containers (506, 508). The NAS system (510) includes a NAS asset (512) that is a file system that includes a million files (520).

The NAS server (522) sends a backup request for backing up the NAS asset (512) to the backup storage system (540). The backup agents (502, 504) each have the configuration and resource availability to utilize 25 streams in parallel for the backup.

The backup manager (500), in response to the request, performs the method of FIG. 2 and assigns one of the available streams for the purpose of performing a pre-backup operation on the NAS asset (512). In this example, one of the 25 streams in backup agent A (502) is reserved for the pre-backup operation. The pre-backup operation includes generating 50 slices. The number of slices is made based on the total available number of streams. The slices are divided evenly based on the number of files. In this example, each slice is associated with 20,000 files. Further, a second stream, in backup agent B (504) is assigned for a post-backup operation.

After the generation of the 50 slices, a slice distribution is performed in accordance with FIG. 3A. Specifically, the slices are grouped based on the average file size of the slices. For slices with an average file size between 0 and 500 kilobytes (KB), the slices are assigned to a first batch. For slices with an average file size greater than 500 KB, the slices are assigned to a second batch.

Following the batching, the backup manager (500) assigns a batch to one of the backup agents (502, 504). In this example, the first batch is assigned to backup agent A (502), and the second batch is assigned to backup agent B (504). Following the assignment, the backup manager (500) sends a request to each backup agent (502, 504) based on the assignment. The request specifies the backup task to be performed by the backup agents (502), 504). In response to the respective requests, the backup agents (502, 504) perform the backup operation by generating the backup agent containers (506) and utilizing each backup agent container (506, 508) to use a stream for obtaining a copy of data corresponding to a slice from the NAS system (510) and transmitting a copy to a stream that is assigned to perform the post-backup operation. Each stream available in backup agent A (502) is used by a backup agent container (506) to perform the backup operation.

The stream in backup agent B (504) assigned for the post-backup operation is used to consolidate the data generated by each stream to obtain a backup of the NAS asset (520). The backup is then transmitted to the backup storage system (540) via the second stream assigned for performing the post-backup operation.

End of Example 1

Example 2

Figure 6:
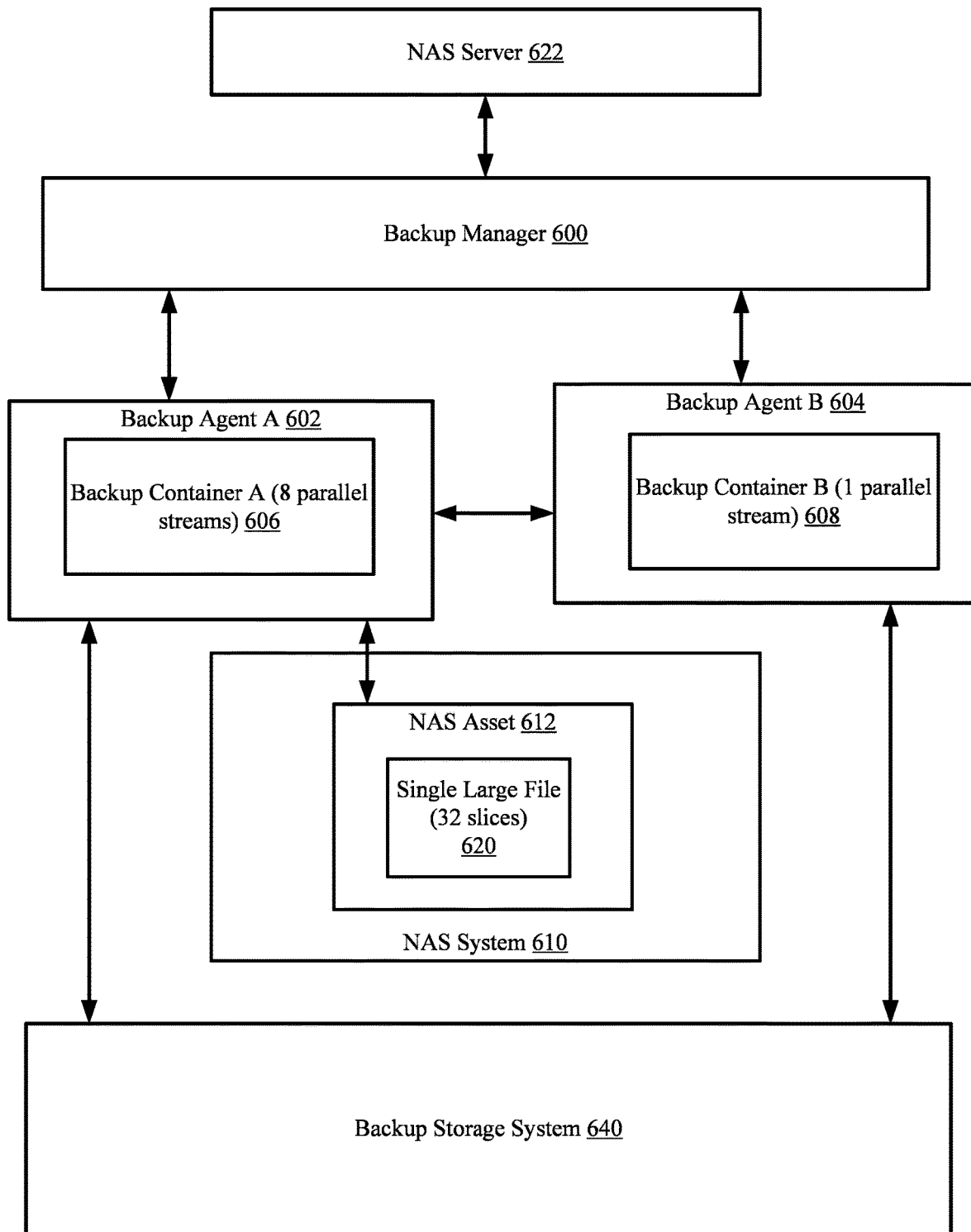

The following section describes an example. The example, illustrated in FIG. 6, is not intended to limit the invention and is independent from any other examples discussed in this application. Turning to the example, consider a scenario in which a NAS server utilizes a backup manager to obtain a backup of a NAS asset that includes a million files stored in a network attached storage (NAS) system.

Turning to the example, FIG. 6 shows a diagram of a second example system. For the sake of brevity, not all components of the second example system may be illustrated in FIG. 6. The second example system may include a backup manager (600), a backup storage system (640), a NAS server (622), two backup managers (602, 604), and a NAS system (610). The backup agents (602, 604) each include a set of backup containers (606, 608). The NAS system (610) includes a NAS asset (612) that is a file system that includes a single large file (620).

The NAS server (622) sends a backup request for backing up the NAS asset (612) to the backup storage system (640). The backup agents (602, 604), collectively, are configured to utilize 9 streams in parallel for the backup. Specifically, backup agent A (602) is configured to utilize 8 streams for the backup of the NAS asset (620), and backup agent B (604) is configured to utilize one stream for the backup.

The backup manager (600), in response to the request, performs the method of FIG. 2 and assigns one of the available streams for the purpose of performing a pre-backup operation on the NAS asset (612). In this example, one of the 8 streams in backup agent A (602) is reserved for the pre-backup operation. The pre-backup operation includes generating 32 slices. The number of slices is made based on a slice size limit. The slices are divided evenly to stay below the slice size limit. In this example, each slice is associated with 500 KB of data. Further, the stream in backup agent B (604) is assigned for a post-backup operation.

After the generation of the 32 slices, the stream performing the pre-backup operation becomes available. A slice distribution is performed in accordance with FIG. 3B. Specifically, 8 of the slices are distributed to the remaining 8 streams in backup agent A (602). The remaining 21 slices are assigned to a queue. Following the assignment, the backup manager (600) sends a request to each backup agent (602, 604) based on the assignment. The request specifies the backup task to be performed by the backup agents (602), 604). In response to the respective requests, backup agent A (602) performs the backup operations by generating a backup agent container (606) and instructing backup agent A container (606) to use the 8 streams for obtaining a copy of data corresponding to the assigned slices from the NAS system (610) and transmitting the copies to the stream in backup agent B (604) that is assigned to perform the post-backup operation.

As each stream completes its backup operation for the assigned slice, the backup manager (600) monitors the backup operations and re-assigns a new slice from the queue to the available streams. In this manner, all 32 slices are processed over time.

The stream in backup agent B (604) assigned for the post-backup operation is used to consolidate the data generated by each stream to obtain a backup of the NAS asset (620). The backup is then transmitted to the backup storage system (640) via the second stream assigned for performing the post-backup operation.

End of Example 2

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

One or more embodiments of the invention may be implemented using instructions executed by one or more processors of the backup manager. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing network attached storage (NAS) assets, the method comprising:
   obtaining a backup request for backing up the NAS assets;
   in response to the backup request:
      determining a number of streams available to be performed in parallel by a set of backup agents;
      obtaining a set of slices associated with the NAS assets, wherein each slice of the set of slices is a portion of data associated with the NAS assets, and wherein each slice comprises multiple files;
      performing a categorization on the set of slices based on metadata associated with the set of slices to obtain a set of batches,
         wherein the set of batches is generated based on a batching performed using the metadata to group the slices based on one of a list consisting of: an average file size of the slices, a number of files in each slice, and a total size of the slices;
      initiating a slice distribution of the set of slices to the set of backup agents based on the set of batches and the number of streams; and
      storing the set of slices in a backup storage system.

2. The method of claim 1, wherein the metadata specifies a number of files in each slice of the set of slices.

3. The method of claim 1, wherein the metadata specifies an average size of files in each of the set of slices.

4. The method of claim 1, wherein initiating the slice distribution comprises assigning a first batch to a first stream of the streams and assigning a second batch to a second stream of the streams.

5. The method of claim 4, wherein after assigning the first batch to the first stream and the second batch to the second stream, the first stream and the second stream transmit the first batch and the second batch in parallel.

6. The method of claim 1, wherein the set of slices is generated based on the number of streams.

7. The method of claim 1, wherein the NAS assets are stored in a NAS system, and wherein the set of backup agents are operatively connected to the NAS system and the backup storage system.

8. The method of claim 1, wherein each of the set of backup agents comprises a NAS container that provides at least one of the streams.

9. A non-transitory computer readable medium comprising computer readable program code, which when executed by a computer processor enables the computer processor to perform a method for managing network attached storage (NAS) assets, the method comprising:
obtaining a backup request for backing up the NAS assets;
in response to the backup request:
determining a number of streams available to be performed in parallel by a set of backup agents;
obtaining a set of slices associated with the NAS assets, wherein each slice of the set of slices is a portion of data associated with the NAS assets, and wherein each slice comprises multiple files;
performing a categorization on the set of slices based on metadata associated with the set of slices to obtain a set of batches,
wherein the set of batches is generated based on a batching performed using the metadata to group the slices based on one of a list consisting of: an average file size of the slices, a number of files in each slice, and a total size of the slices;
initiating a slice distribution of the set of slices to the set of backup agents based on the set of batches and the number of streams; and
storing the set of slices in a backup storage system.

10. The non-transitory computer readable medium of claim 9, wherein the metadata specifies a number of files in each slice of the set of slices.

11. The non-transitory computer readable medium of claim 9, wherein the metadata specifies an average size of files in each of the set of slices.

12. The non-transitory computer readable medium of claim 9, wherein initiating the slice distribution comprises assigning a first batch to a first stream of the streams and assigning a second batch to a second stream of the streams.

13. The non-transitory computer readable medium of claim 12, wherein after assigning the first batch to the first stream and the second batch to the second stream, the first stream and the second stream transmit the first batch and the second batch in parallel.

14. The non-transitory computer readable medium of claim 9, wherein the set of slices is generated based on the number of streams.

15. The non-transitory computer readable medium of claim 9, wherein the NAS assets are stored in a NAS system, and wherein the set of backup agents are operatively connected to the NAS system and the backup storage system.

16. The non-transitory computer readable medium of claim 9, wherein each of the set of backup agents comprises a NAS container that provides at least one of the streams.

17. A system comprising:
a processor; and
a backup manager comprising the processor, programmed to:
obtain a backup request for backing up NAS assets;
in response to the backup request:
determine a number of streams available to be performed in parallel by a set of backup agents;
obtain a set of slices associated with the NAS assets, wherein each slice of the set of slices is a portion of data associated with the NAS assets, and wherein each slice comprises multiple files;
perform a categorization on the set of slices based on metadata associated with the set of slices to obtain a set of batches,
wherein the set of batches is generated based on a batching performed using the metadata to group the slices based on one of a list consisting of: an average file size of the slices, a number of files in each slice, and a total size of the slices;
initiate a slice distribution of the set of slices to the set of backup agents based on the set of batches and the number of streams; and
store the set of slices in a backup storage system.

18. The system of claim 17, wherein the metadata specifies a number of files in each slice of the set of slices.

19. The system of claim 17, wherein the metadata specifies an average size of files in each of the set of slices.

20. The system of claim 17, wherein initiating the slice distribution comprises assigning a first batch to a first stream of the streams and assigning a second batch to a second stream of the streams.

* * * * *